Jan. 23, 1934.  K. SCHMIDT ET AL  1,944,579
SYNCHRONOUS ALTERNATING CURRENT MOTOR
Filed Jan. 27, 1930
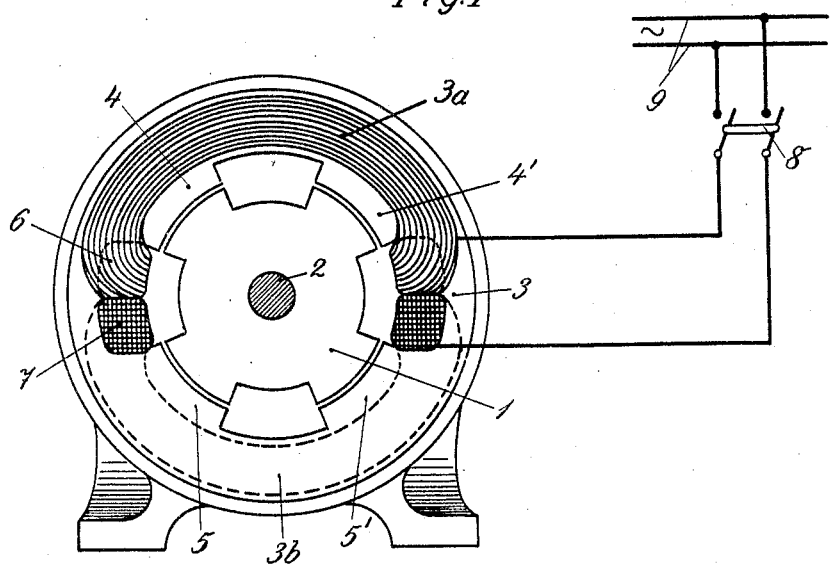
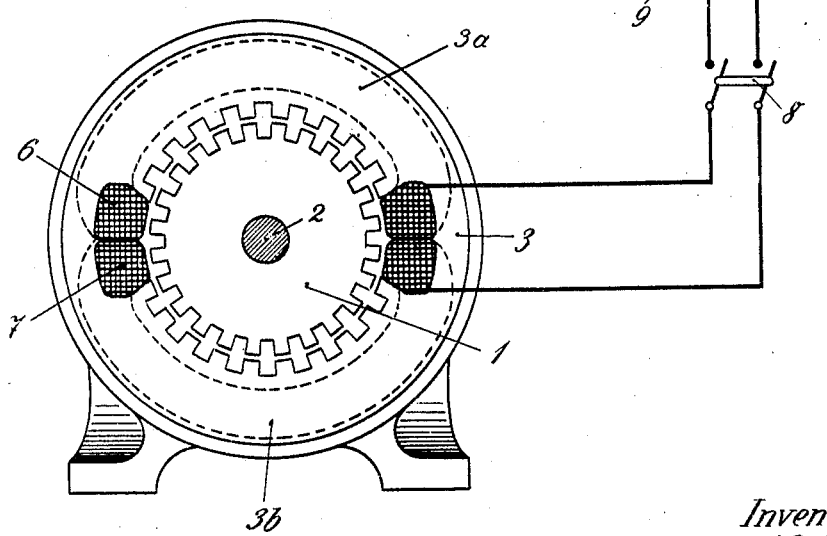
Inventors:
Karl Schmidt
and Kurt Schöler
Attorney Patented Jan. 23, 1934

1,944,579

UNITED STATES PATENT OFFICE 1,944,579

SYNCHRONOUS ALTERNATING CURRENT MOTOR

Karl Schmidt, Berlin-Lichtenrade, and Kurt Schöler, Berlin-Ruhleben, Germany, assignors to C. Lorenz Aktiengesellschaft, Berlin-Tempelhof, Germany Application January 27, 1930, Serial No. 423,665, and in Germany May 3, 1929

1 Claim. (Cl. 172—275)

We have filed applications in Germany May 3, 1929; Holland August 17, 1929; Great Britain August 13, 1929; France August 14, 1929.

All the synchronous motors known up to the present possess as soon as they are in synchronism a latent flux either in the stator or in the rotor, which flux in most instances is maintained by a special excitation of direct current. Thus it is always necessary to provide for the operation of a motor of this type besides the synchronizing frequency a special source of direct current, which is a disadvantage. In addition the known synchronous motors, in particular those adapted for single phase alternating current, are started with difficulty only, since they are able to develop a turning moment only at the synchronous speed. For that reason special starting motors are required in order to bring the motor to the synchronous speed. A further disadvantage of these machines is that very great difficulties are experienced if it is desired to produce synchronous motors of small output for operation at very low speeds, since the number of the direct current excitation poles which determines the speed, is limited by the constructive arrangement of the machine.

The present invention obviates these inconveniences and it is shown how to construct a synchronous motor, which is simple in construction and which can be easily started by small auxiliary means.

It is also possible according to the present invention to produce, at small cost, very low speed small synchronous motors as are required for the operation of electrical talking machines, clocks and the like.

The subject matter of the invention consists of a synchronous motor, which possesses only on the poles of the stator an excitation winding through which alternating current is passing, while the rotor, which in its constructive arrangement is similar to the armature of a direct current machine, has no windings. Both the rotor and stator are premeated by a flux of alternating current generated by the excitation winding, and the main poles of the stator are subdivided into sub-poles in such a manner, that they possess the same pole division as the toothed rotor. The magnetic flux will thus change periodically between its positive and negative maximum value.

If a machine of this class is excited by alternating current, it will show no turning moment yet in the beginning and it must first be brought to the synchronous speed or near such synchronous speed, which is possible by simple means, as will be described hereinafter. A machine constructed according to this invention and operated as a synchronous motor shows remarkable advantages, which consist on the one hand in a very simple arrangement of the windings, since the excitation coils can be wound on patterns, and besides in the marked constructive simplicity (the rotor carries no windings of any sort).

In addition it is possible to obtain any desired speed in a highly simple manner by subdividing the main poles of the stator or by the choice of the number of teeth of the rotor respectively.

In order to run the motor in synchronism the already known synchronizing devices may be employed, for instance starting motors, starting cranks and the like.

In the drawing is illustrated a preferred mode of execution of the arrangement according to the invention by way of example, and it is Figure 1 a diagrammatic view of a synchronous motor according to the invention, Figure 2 is a view similar to that shown in Figure 1, Referring to Figure 1 the rotor 1 of the machine is provided with four teeth and slots and mounted on the shaft 2. The stator 3 is subdivided in two mainpoles 3a and 3b which possess a slot each according to the division of the rotor, so that each main pole is divided in two sub-poles 4 and 4' and 5 and 5' respectively. 6 and 7 denote the excitation winding, which is passed over the main poles of the stator and connected to the alternating current network 9 by way of the switch 8. The number of revolutions of this motor is determined by the number of the teeth, into which the rotor is subdivided. At a working frequency of 50 cycles per second the synchronous motor illustrated would thus possess a number of revolutions of $$n = \frac{50.120}{4} = 1500 \text{ revolutions per minute.}$$

In Figure 2 a motor according to the invention is shown having a speed of 250 revolutions per minute. The arrangement of the excitation winding and the main poles 3a and 3b is again the same as that shown in Figure 1, however there is the difference, that the rotor is divided into 24 teeth and slots while the main poles 3a and 3b of the stator are provided with a number of teeth corresponding to the division of teeth of the rotor. By a further subdivision of the rotor and the main poles of the stator in teeth and slots, the speed of such a motor can of course still be reduced, so that even the construction of a synchronous motor working at 50 revolutions per minute, where the rotor must be provided with 120 teeth, will offer no difficulties.

We claim:

A single phase synchronous motor for driving directly a talking machine and comprising a stator having but one pair of poles, each pole surrounding approximately one-half the circumference of the rotor surface; a winding for each pole and connectible to a source of alternating current, each of said poles being slotted to provide a plurality of teeth, the rotor also being slotted to provide a plurality of teeth the pitch of which is equal to the pitch of the stator teeth, and all the teeth of the rotor being directly opposite the stator teeth.

KARL SCHMIDT.
KURT SCHÖLER.